United States Patent [19]

Carroll, Jr.

[11] Patent Number: 5,914,143

[45] Date of Patent: Jun. 22, 1999

[54] LONG-TERM PRESERVATION OF APPLE SLICES AND THE LIKE

[75] Inventor: Daniel E. Carroll, Jr., Raleigh, N.C.

[73] Assignee: North Carolina State University, Raleigh, N.C.

[21] Appl. No.: 08/069,456

[22] Filed: Jun. 1, 1993

Related U.S. Application Data

[63] Continuation of application No. 07/750,925, Jul. 28, 1991, abandoned.

[51] Int. Cl.$^6$ ............................... A23L 1/22; A23C 3/00; A21D 4/00
[52] U.S. Cl. ......................... 426/270; 426/321; 426/639
[58] Field of Search ................................. 426/270, 321, 426/639

[56] References Cited

U.S. PATENT DOCUMENTS

| | | | |
|---|---|---|---|
| 2,004,354 | 6/1935 | Tierney | 426/639 X |
| 2,379,068 | 6/1945 | Derby | 99/206 |
| 2,528,008 | 10/1950 | La Vine | 99/192 |
| 2,678,277 | 5/1954 | Glave | 426/270 |
| 3,025,169 | 3/1962 | Guadagni | 426/270 X |
| 3,245,807 | 4/1966 | Colby | 99/156 |
| 3,754,938 | 8/1973 | Ponting | 426/321 |
| 3,764,348 | 10/1973 | Huxsoll et al. | 426/310 |
| 4,006,257 | 2/1977 | Kolk | 426/270 X |
| 4,767,630 | 8/1988 | Silver et al. | 426/270 X |

*Primary Examiner*—Nina Bhat
*Attorney, Agent, or Firm*—Jenkins & Wilson, P.A.

[57] ABSTRACT

Apple slices are introduced into a preservative solution comprising about 8%–20% of a sweetening agent, about 0.1%–0.6% of an edible acid, and about 0.015%–0.025% of sulfur dioxide. The fruit pieces are then placed under a vacuum and then, after the vacuum is released, maintained in the preservative solution for a sufficient time to allow the fruit pieces to absorb the preservative solution into the tissue thereof. Thereafter, the treated fruit pieces may then be stored in a refrigerated environment for periods up to three months or more without significant deterioration in appearance, texture and taste and without any increase in bacteria count over their near sterile condition after undergoing the above process.

28 Claims, No Drawings

LONG-TERM PRESERVATION OF APPLE SLICES AND THE LIKE

This is a continuation of co-pending application Ser. No. 07/750,925 filed on Jul. 28, 1991, now abandoned.

TECHNICAL FIELD

The present invention relates to the provision of a novel process for preserving apple slices for an extended period of time, and more particularly to a novel process for preserving apple slices in a refrigerated storage environment for up to three months or more without spoilage and without appreciable loss in color, flavor or texture.

RELATED ART

As is well known to those skilled in the art, many efforts have been made in order to develop a suitable process for storing apple slices for an extended period of time without significant deterioration in color, flavor or texture. However, all of these processes suffer shortcomings of one kind or another and applicant is not aware of any known process which provides for storing fresh apple slices for up to three (3) months or more without deterioration prior to final processing or use of the apple slices.

Related art of interest includes U.S. Pat. No. 2,437,752 to Nickerson which discloses a process for the inhibition or prevention of the development of off-flavor in frozen grapefruit which comprises treating sections of grapefruit pulp with a solution comprising sugar and the off-flavor inhibitors caffeic and/or hydrocaffeic acid and then freezing the treated fruit. In this fashion, the grapefruit may be stabilized against off-flavor development during freezing in subsequent frozen storage over a period of time.

U.S. Pat. No. 2,528,008 to La Vine discloses a process for protecting frozen food from decomposition for a prolonged period of time utilizing a process consisting of coating the food with a solution of calcium polysulfide.

U.S. Pat. No. 3,764,348 to Huxsoll et al. teaches a process for the preservation of peaches in a fresh state prior to final processing by canning/freezing or the like. The process comprises dipping the fresh peach sections into an aqueous solution of calcium chloride and ascorbic acid and then storing the treated peach sections in a dilute aqueous solution of citric or lactic acid or mixtures thereof. The process purports to maintain the fruit in a fresh state for a period of time with the retention of its natural appearance, texture, color, and flavor.

Also, U.S. Pat. No. 3,245,807 to Colby discloses a process for preserving apple pieces in a fresh state comprising applying a vacuum to the apple pieces for a sufficient time to expel the gases from the tissue, submerging the apple pieces in an aqueous solution of 0.01%–3% by weight of apple improvers selected from the group consisting of citric acid, malic acid, fumaric acid, tartaric acid, acidic acid, oxalic acid, ascorbic acid, lactic acid, calcium chloride, calcium lactate, calcium citrate, calcium malate, and tricalcium phosphate to infuse the solution into the apple. The apple slices are then drained of excess non-infused solution, sealed in a can under a vacuum, and the sealed product then heated at a temperature from 190° F.–210° F. for 5–20 minutes. The can is then quickly cooled to less than about 100° F.

Although the above discussed processes and related treatments such as holding whole fresh fruit or pieces thereof in cold storage pending final processing are well known and practiced in the art of fruit preservation, all of the previously known fruit preservation techniques suffer shortcomings which are only too well known to those skilled in the art. By contrast, applicant has discovered a process which requires only minimum processing of fresh apple slices without a heat treatment and yet, quite unexpectedly and surprisingly, enables the apple slices to be stored in a refrigerated environment for up to three (3) months without any spoilage and without any appreciable loss in acceptability in color, flavor or texture. Also, surprisingly and unexpectedly, applicant has discovered that the apple slices essentially are rendered nearly sterile by the treatment and that microbiological counts show no significant microbial growth during the long-term preservation in the refrigerated environment.

DISCLOSURE OF THE INVENTION

In accordance with the present invention, applicant provides a process for long-term preservation of apple slices and the like for up to three (3) months or more without spoilage or noticeable loss in color, flavor or texture. Applicant's novel process comprises first separating the fruit into a plurality of individual pieces and then introducing the fruit pieces into a preservative solution comprising about 8%–20% by weight of a sweetening agent, about 0.1%–0.6% by weight of an edible acid, and about 0.015%–0.025% by weight of sulfur dioxide. The fruit pieces in the preservative solution are next placed under a vacuum in order to remove at least a portion of the air and/or other gases from the tissue thereof, and the vacuum is released and the fruit pieces then are maintained in the preservative solution for a sufficient time to allow the fruit pieces to absorb at least a portion of the preservative solution. Finally, the treated fruit pieces are stored in a refrigerated environment for a time which may extend up to three (3) months or more and the fruit pieces will still maintain a fresh taste and appearance.

It is therefore the object of the present invention to provide a novel process for preserving apple slices and the like for an extended period prior to final use or consumption without any loss in taste and appearance.

It is another object of the present invention to provide a process for preserving apple slices and the like without heat treatment and for an extended period of time without significant microbial growth during the storage.

It is yet another object of the present invention to provide a novel process for preserving apple slices and the like for an extended period of time without deterioration in taste, texture or appearance and which is simple and inexpensive to effect but which results in an unexpected and surprising increase in the length of usable storage life.

Some of the objects of the invention having been stated, other objects will become evident from the following description wherein parts and percentages are by weight unless otherwise specified.

BEST MODE FOR CARRYING OUT THE INVENTION

The practice of the invention is further explained in more detail below. Also, applicant wishes to note that although the invention is described in terms of an improved method for long-term preservation of apple slices, applicant contemplates that the invention also includes the treatment of other types of fruit such as peaches and pears and the scope of the invention is intended to be broad enough to include the same.

Utilizing equipment which would be well known to those skilled in the apple slice preservation art, apples are mechanically peeled, cored and sliced in a conventional manner. The apple slices are then placed into a perforated stainless steel basket fitted with a perforated lid. After the basket is closed by placing the lid thereon, the apple slices are submerged into an aqueous solution containing about 8%–20% of a sweetening agent such as sucrose, invert sugar, dextrose, lactose, honey, maltose, fructose, maple syrup, or corn syrup solids, about 0.1%–0.6% of an edible acid such as citric acid, malic acid, fumaric acid, phosphoric acid, ascorbic acid and erythorbic acid, and about 0.015%–0.025% of sulfur dioxide. The solution is most suitably at an ambient temperature of about 22° C., but is effective over a wide range of processing temperatures.

The container of apple slices and solution is next placed into a vacuum chamber at a suitable vacuum (for example, about 27 inches of mercury) for a sufficient time (for example, about 10 minutes) in order to remove at least a portion of the air and/or other gases from the apple tissue. The container is then removed from the vacuum chamber and the apple slices held submerged in the aforementioned aqueous solution for an effective period of time (at least one hour and preferably 24 hours or more) to allow the fruit pieces to absorb a portion of the aqueous preservative solution into the tissue thereof. Finally, the apple slices are removed from the aqueous preservative solution, drained and placed into a container for refrigerated storage wherein the apple slices can be maintained in fresh condition for a period of up to three (3) months or more. Alternatively, the apple slices in the aqueous preservative solution may be placed directly into refrigerated storage after removal from the vacuum chamber. When the apples are removed from the refrigerated storage, they possess excellent taste, color and texture which is similar in sensory acceptability to fresh apple slices which have not been subjected to preservation.

Optionally, the aqueous preservative solution may include about 0.0%–0.3% of calcium chloride, and preferably about 0.1% of calcium chloride, to serve as a firming agent for the apple tissue.

The preservative solution utilized in the process of the invention preferably comprises about 12% of sucrose for providing a favorable sweet taste to the preserved apple slices, about 0.3% of malic acid to provide a desirable acid flavor to the preserved apple slices, about 0.1% of calcium chloride to serve as a tissue firming agent, and (most importantly), about 0.020% (about 200 ppm) of sulfur dioxide to serve as a microbiological inhibitor and in order to prevent browning of the apple slices. Applicant believes that there is a synergistic interaction between the malic acid and the sulfur dioxide of the aqueous preservative solution which serves to maintain the pH of the apples during storage in a low pH range of about 3.0–3.2 to allow the very small amount of residual sulfur dioxide (apparently about 0.006% or 60 ppm) to effectively act to prevent browning and spoilage of the apple slice tissue.

The invention may be better understood with reference to the following examples which even better illustrate the unexpected and surprising ability of the novel process to preserve apple slices for an extended period of time while maintaining the appearance, texture and taste acceptability of the apple slices.

Example 1

Fresh whole Rome apples were selected. The fresh whole Rome apples were mechanically peeled, cored and sliced radially into twelfths and (optional if there is an extended holding period) put into a 0.3% by weight holding solution of malic acid to prevent browning. The slices were placed into a perforated stainless steel basket fitted with a perforated lid. The basket of slices was then submerged into the treatment solution and placed into a vacuum chamber. The treatment solution contained 12% sucrose, 0.3% malic acid, 0.1% calcium chloride and sulfur dioxide concentrations ranging from 0.01% to 0.1% as listed below. The sulfur dioxide was supplied in the form of potassium metabisulfite. The slices were held under approximately 27 inches of vacuum for 10 minutes. After the vacuum was broken, the slices were held submerged in the treatment solution and placed directly into refrigerated storage at 4° C.

The apple slices were subjected to six (6) treatments as described above with the following concentrations of sulfur dioxide:

1. Treatment 1—0.010% (100 ppm)
2. Treatment 2—0.020% (200 ppm)
3. Treatment 3—0.030% (300 ppm)
4. Treatment 4—0.050% (500 ppm)
5. Treatment 5—0.070% (700 ppm)
6. Treatment 6—0.100% (1000 ppm)

The apple slices treated with the aqueous preservative solution containing 0.010% sulfur dioxide exhibited internal darkening after one week of storage in the preservative solution. Apple slices treated with aqueous preservative solution using 0.030% and more sulfur dioxide were noticeably bleached after one month of storage in the aqueous preservative solution. However, there was no significant change in taste and appearance for the apple slices treated with the aqueous preservative solution utilizing 0.020% sulfur dioxide in refrigerated storage for three (3) months.

Example 2

Fresh whole Golden Delicious apples were selected. The Golden Delicious apples were mechanically peeled, cored and sliced radially into twelfths and (optional if there is an extended holding period) put into a 0.3% by weight holding solution of malic acid to prevent browning. The slices were placed into a perforated stainless steel basket fitted with a perforated lid. The basket of slices was then submerged into the treatment solution and placed into a vacuum chamber. The treatment solution contained 12% sucrose, 0.3% malic acid, 0.1% calcium chloride and sulfur dioxide concentrations ranging from 0.01% to 0.03% as listed below. The sulfur dioxide was supplied in the form of potassium metabisulfite. The slices were held under approximately 27 inches of vacuum for 10 minutes. After the vacuum was broken, the slices were held submerged in the treatment solution and placed directly into refrigerated storage at 4° C.

The apple slices were subjected to five treatments as described above with the following concentration of sulfur dioxide:

1. Treatment 1—0.010% (100 ppm)
2. Treatment 2—0.015% (150 ppm)
3. Treatment 3—0.020% (200 ppm)
4. Treatment 4—0.025% (250 ppm)
5. Treatment 5—0.030% (300 ppm)

The test results indicated that the apple slices treated with the aqueous preservative solution utilizing 0.010% sulfur dioxide exhibited internal darkening after only ten days of refrigerated storage. After one month of storage, internal browning had appeared on approximately 30% of the apple slices treated with the aqueous preservative solution utilizing 0.015% sulfur dioxide, and apple slices treated with the preservative solution utilizing 0.030% sulfur dioxide were noticeably bleached after two months of refrigerated storage. Significantly, there was no change in apple slices treated with the preservative solution utilizing both 0.020% and 0.025% sulfur dioxide.

The test results indicate the criticality of the effective concentration of sulfur dioxide in the preservative solution in order to achieve satisfactory results with the novel process of the invention. It is apparent that the use of a preservative solution with 0.015% sulfur dioxide is probably too little sulfur dioxide to prevent browning over time and that the use of a solution comprising 0.030% sulfur dioxide results in undesirable noticeable bleaching. A preservative solution comprising 0.020% sulfur dioxide was determined to be the most effective concentration for practicing the method of the present invention.

Example 3

Golden Delicious apples were selected. The Golden Delicious apples were mechanically peeled, cored and sliced radially into twelfths and (optional if there is an extended holding period) put into a 0.3% by weight holding solution of malic acid to prevent browning. The slices were placed into a perforated stainless steel basket fitted with a perforated lid. The basket of slices was then submerged into the treatment solution and placed into a vacuum chamber. The treatment solution contained 12% sucrose, 0.3% malic acid, 0.1% calcium chloride and 0.02% sulfur dioxide. The sulfur dioxide was supplied in the form of potassium metabisulfite. The slices were held under approximately 27 inches of vacuum for 10 minutes. After the vacuum was broken, the slices were held submerged in the treatment solution and placed directly into refrigerated storage at 4° C.

Sensory panels were conducted on the apple slices over a five month period by fifteen panelists judging apple slice samples identified only by a code. The tested apple slices were rated for color, flavor and texture with a scoring based on the following scale: 1–2 Poor; 2–3 Fair; 3–4 Good; and 4–5 Excellent. The results are set forth below.

| | Average Scores | | | |
|---|---|---|---|---|
| | Storage Time | Color | Flavor | Texture |
| Golden Delicious | 1 week | 3.8 | 4.2 | 3.7 |
| Rome | | 3.1 | 3.1 | 4.1 |
| Golden Delicious | 6 weeks | 4.0 | 3.5 | 3.6 |
| Rome | | 3.6 | 2.8 | 4.7 |
| Golden Delicious | 13 weeks | 4.1 | 3.2 | 3.6 |
| Rome | | 3.1 | 3.1 | 4.2 |
| Golden Delicious | 22 weeks | 3.0 | 3.1 | 4.1 |
| Rome | | 3.1 | 3.2 | 3.6 |

Very significantly, after over five (5) months of refrigerated storage of the apple slices treated in accordance with the instant invention there was no statistically significant change in color, flavor or texture in the apple slices. All characteristics were judged good or better (over 3) during the entire refrigerated storage period. The favorable results achieved in the tests of Example 3 have also been duplicated for other varieties of apples including York, Granny Smith and Red Delicious. Moreover, and also quite surprisingly, apple slices which have been held in a controlled, refrigerated atmosphere storage for up to a year after harvest date have produced a consumer-acceptable, processed apple slice.

Example 4

Applicant has also very unexpectedly and surprisingly discovered that non-sterile apple slices treated in accordance with the present invention become nearly sterile and do not have any significant change in bacteria count over the long-term preservation period in refrigerated storage prior to final use. To make this determination, applicant selected Rome, Red Delicious and Golden Delicious apples. The Rome, Red Delicious and Golden Delicious apples were mechanically peeled, cored and sliced radially into twelfths and (optional if there is an extended holding period) put into a 0.3% by weight holding solution of malic acid to prevent browning. The slices were placed into a perforated stainless steel basket fitted with a perforated lid. The basket of slices was then submerged into the treatment solution and placed into a vacuum chamber. The treatment solution contained 12% sucrose, 0.3% malic acid, 0.1% calcium chloride and 0.02% sulfur dioxide. The sulfur dioxide was supplied in the form of potassium metabisulfite. The slices were held under approximately 27 inches of vacuum for 10 minutes. After the vacuum was broken, the slices were held submerged in the treatment solution for 24 hours, drained and placed into containers for refrigerated storage.

Thereafter, microbiological plate counts were made of the treated apple slices over a variety of different storage times. The slices were tested for bacteria, yeast and molds (psychotrophs) and the results are set forth below.

| Processing Date | Test Date | CFU/gm |
|---|---|---|
| 3/16/89 | 3/16/89 | $1.85 \times 10^1$ |
| 3/16/89 | 3/30/89 | $1.0 \times 10^1$ |
| 3/16/89 | 4/13/89 | <1 |
| 3/16/89 | 3/08/90 | <1 |
| 4/11/89 | 5/23/89 | <1 |
| 4/11/89 | 11/4/89 | <1 |
| 5/24/89 | 11/4/89 | <1 |

As can be seen, the plate counts of the apple slices in the test usually indicated less than 1 CFU/gm (colony forming units/gram) or near sterile conditions when processed. Very surprisingly, the apple slices tested in periods up to one year after storing continued to show a near sterile condition with respect to bacteria, yeast and molds.

It will be understood that various details of the invention may be changed without departing from the scope of the invention. Furthermore, the foregoing description is for the purpose of illustration only and not for the purpose of limitation—the invention being defined by the claims.

What is claimed is:

1. A method of preparing and preserving fresh fruit for extended storage comprising the steps of:

separating the fruit into a plurality of individual pieces;

introducing the fruit pieces into an aqueous preservative solution comprising about 8–20% by weight of a non-artificial sweetening agent, about 0.1–0.6% by weight of an edible acid, and about 0.015–0.025% by weight of sulfur dioxide;

placing the fruit pieces in the preservative solution under a vacuum to remove at least a portion of the air from the fruit pieces;

releasing the vacuum and maintaining the fruit pieces in the preservative solution for at least a sufficient time to allow the fruit pieces to absorb at least a portion of the preservative solution therein; and then placing the fruit pieces directly in a non-freezing refrigerated environment at a pH of about 3.0 to 3.2 for storage.

2. A method according to claim 1 wherein the preservative solution further comprises about 0.0–0.3% by weight of calcium chloride.

3. A method according to claim 2 wherein the preservative solution comprises about 0.1% by weight of calcium chloride.

4. A method according to claim 1 wherein the preservative solution comprises about 12% by weight of a sweetening agent.

5. A method according to claim 4 wherein the sweetening agent in the preservative solution is sucrose.

6. A method according to claim 1 wherein the edible acid in the preservative solution is malic acid.

7. A method according to claim 6 wherein the preservative solution comprises about 0.3% by weight of malic acid.

8. A method according to claim 1 wherein the preservative solution comprises about 0.020% by weight of sulfur dioxide.

9. A method according to claim 1 wherein the fruit pieces are maintained in the preservative solution for at least one hour.

10. A method according to claim 1 wherein the fruit pieces are maintained in the preservative solution for up to 24 hours.

11. A method according to claim 1 wherein the fruit pieces are stored in a refrigerated environment in the preservative solution.

12. A method according to claim 11 wherein the fruit pieces in the preservative solution are placed directly into refrigerated storage after the vacuum thereon is released.

13. A method according to claim 1 wherein the fruit pieces are removed from the preservative solution for storage in a refrigerated environment.

14. A method according to claim 13 wherein the fruit pieces are removed from the preservative solution for storage in a refrigerated environment.

15. A method of preparing and preserving fresh fruit for extended storage comprising the steps of:

separating the fruit into a plurality of individual pieces;

introducing the fruit pieces into an aqueous preservative solution, comprising about 8–20% by weight of sucrose, about 0.1–0.6% by weight of malic acid, and about 0.015–0.025% by weight of sulfur dioxide;

placing the fruit pieces in the preservative solution under a vacuum to remove at least a portion of the air from the fruit pieces;

releasing the vacuum and maintaining the fruit pieces in the preservative solution for at least one hour to allow the fruit pieces to absorb at least a portion of the preservative solution therein; and then placing the fruit pieces directly in a non-freezing refrigerated environment at a pH of about 3.0 to 3.2 for storage.

16. A method according to claim 15 wherein the preservative solution further comprises about 0.1–0.3% by weight of calcium chloride.

17. A method according to claim 16 wherein the preservative solution comprises about 0.1% by weight of calcium chloride.

18. A method according to claim 15 wherein the preservative solution comprises about 12% by weight of sucrose.

19. A method according to claim 15 wherein the preservative solution comprises about 0.3% by weight of malic acid.

20. A method according to claim 15 wherein the preservative solution comprises about 0.020% by weight of sulfur dioxide.

21. A method according to claim 15 wherein the fruit pieces are maintained in the preservative solution for about 24 hours.

22. A method according to claim 15 wherein the fruit pieces are stored in a refrigerated environment in the preservative solution.

23. A method according to claim 22 wherein the fruit pieces in the preservative solution are placed directly into refrigerated storage after the vacuum thereon is released.

24. A method of preparing and preserving fresh fruit for extended storage comprising the steps of:

separating the fruit into a plurality of individual pieces;

introducing the fruit pieces into an aqueous preservative solution consisting essentially of about 12% by weight of sucrose, about 0.3% by weight of malic acid, about 0.020% by weight of sulfur dioxide, and about 0.1% by weight of calcium chloride;

placing the fruit pieces in the preservative solution under a vacuum to remove at least a portion of the air from the fruit pieces;

releasing the vacuum and maintaining the fruit pieces in the preservative solution for at least up to 24 hours to allow the fruit pieces to absorb at least a portion of the preservative solution therein; and then placing the fruit pieces directly in a non-freezing refrigerated environment at a pH of about 3.0 to 3.2 for storage up to three months or more.

25. A method according to claim 24 wherein the fresh fruit is apples.

26. A method according to claim 24 wherein the fruit pieces are stored in a refrigerated environment in the preservative solution.

27. A method according to claim 26 wherein the fruit pieces in the preservative solution are placed directly into refrigerated storage after the vacuum thereon is released.

28. A method according to claim 23 wherein the fruit pieces are removed from the preservative solution for storage in a refrigerated environment.

* * * * *